United States Patent [19]
Pozek

[11] Patent Number: 5,647,253
[45] Date of Patent: Jul. 15, 1997

[54] METHOD AND APPARATUS FOR A THEFT RESISTANT FASTENER

[76] Inventor: Juraj Pozek, 11092 Bell Road, Lemont, Ill. 60439

[21] Appl. No.: 426,081

[22] Filed: Apr. 21, 1995

[51] Int. Cl.$^6$ ................................................ B25B 13/06
[52] U.S. Cl. .......................... 81/125; 81/176.2; 81/461; 411/405; 411/407; 411/910
[58] Field of Search ............................ 81/121.1, 442, 81/448, 456, 460, 461, 176.1–176.15, 125, 124.2; 411/402–407, 500, 504, 910

[56] References Cited

U.S. PATENT DOCUMENTS

| | | |
|---|---|---|
| 2,805,594 | 9/1957 | Fogel ........................................ 81/125 |
| 4,060,113 | 11/1977 | Matsushima ............................ 81/125 |
| 4,686,874 | 8/1987 | McCauley et al. ..................... 81/461 |
| 5,450,776 | 9/1995 | Kozala ................................ 81/461 X |

FOREIGN PATENT DOCUMENTS

| | | | |
|---|---|---|---|
| 2306991 | 9/1973 | Germany ................................ 411/405 |
| 512073 | 8/1939 | United Kingdom ................... 411/402 |

*Primary Examiner*—D. S. Meislin
*Attorney, Agent, or Firm*—Michael R. McKenna

[57] ABSTRACT

This invention relates to a method and apparatus for fastening two members together with a theft resistant screw having a head with a top surface which is free of any engageable indentations or protrusions, with an independent means to drive the screw.

23 Claims, 2 Drawing Sheets

METHOD AND APPARATUS FOR A THEFT RESISTANT FASTENER

FIELD OF INVENTION

This invention relates to a method and apparatus for a theft resistant fastener, which can be used to fasten one member to another member, as for example to fasten a cover plate to a base member.

BACKGROUND OF THE INVENTION

Alternative technology is available in the form of U.S. Pat. No. 1,300,275 issued to Johnson in April, 1919 which reveals a combination of a screw having a single hole eccentric with respect to the axis of the screw and a removable driving key having an eccentric pin adapted to enter the full length of said screw. Unlike the present invention, a hole is exposed relative to the head of the screw.

U.S. Pat. No. 4,569,259 issued to Rubin et al. on Feb. 11, 1986 discloses an automobile wheel cover locking bolt and wrench combination wherein the head of the locking bolt has a plurality of axial slots, or lock impressions, about its periphery which may be spaced in accordance with a pre-selected code. The wrench socket is provided with a corresponding number of key elements projecting inwardly from the cylindrical wall of the socket, the position of the key elements being in accordance with a matching preselected code. Additionally, the head of the locking bolt has an axial recess and the socket of the wrench has an axial pin adapted to align and fit within the recess of the bolt. All of the recesses are visible from the top plane view of the bolt.

U.S. Pat. No. 2,372,269 issued to Golan on Mar. 27, 1945, relates to a socket wrench and cooperating theft resistant nut with fully extending slots and grooves.

A brake tool disclosed in U.S. Pat. No. 5,003,681 by Schley in 1991 reveals a disc like tool having a pin disposed to engage a depression in the surface of a piston.

An anti-theft apparatus including a screw with an anti-theft safety head is disclosed in U.S. Pat. No. 4,964,773 dated Oct. 23, 1990 issued to Schmidt. The disclosed device is for a screw with an extended head that is arranged and adapted to support a locking device which may freely rotate if not set in a locking position. Thus, the head freely rotates relative to the screw preventing the screw from being removed unless the head is first locked thereto. Unlike the present invention, the head is not removable, but merely rotatable about the screw and the structure disclosed is considerably different.

A patent issued to Burge on Jun. 7, 1977, U.S. Pat. No. 4,027,572 reveals a theft resistant screw fastener with both the tool and the nut having axial recesses which accommodate a dowel arranged and adapted to have one of its ends disposed in the recess of the nut and the other in the recess of the tool.

Some of the drawbacks to these designs are that each teaches fasteners that are more readily removable by theft since indentations which can be easily grasped are exposed. Moreover, none of the foregoing inventions is designed to be theft resistant in a surface recess (i.e. a countersunk borehole sized to accommodate the socket body of the wrench).

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

To alleviate this problem, and others which will become apparent from the disclosure which follows, the present invention conveniently provides a method and apparatus for fastening a theft resistant screw having a head with a top surface that is free of any engageable variations, comprising engageable indentations or engageable protrusions with an independent means to drive the screw.

The independent means to drive the screw is provided in terms of a wrench having a socket and a movable plug that fits into a cavity created by the alignment of a recess in the outer cylindrical wall of the screw head and a socket recess in the inner wall of the socket.

An advantage is revealed in a preferred embodiment of the movable plug of the invention which reveals an elongated plug whose thickness is less than the distance between the inner wall and the outer wall of the socket body. This facilitates the removal of the plug from a countersunk borehole in the first of two members that are to be fastened together. In instances where the countersunk borehole (for example, in a cover plate or other article to be fastened to a second member) is sized only nominally larger than the socket body and the head of the screw is only nominally smaller than the inner wall of the socket, then the plugs must necessarily be of limited thickness, otherwise it will not be possible to remove the plug from the cavity defined by the wall of the countersunk borehole when the screw is fully fastened in said borehole.

In a preferred mode, the head diameter of the screw and socket body diameter would be engineered to minimize the wall thickness of the side wall of the socket, and thus limit the thickness of the plugs. This would inhibit theft of a screw imbedded in a surface with a countersunk borehole slightly larger than the outer diameter of the socket body, as the limited distance between the head and the outer wall of the countersunk hole would limit access to an extraneous tool.

Still other advantages will be apparent from the disclosure that follows.

SUMMARY OF THE INVENTION

The invention relates to a method and apparatus for a theft resistant fastener for fastening two members together comprising a screw having a shank and a generally cylindrical head disposed concentrically on an end of the shank. The generally cylindrical head has an outer side wall with an upper edge and a lower edge. The lower edge is proximate to the shank and the outer side wall has at least one recess extending longitudinally from its lower edge to a spaced distance from its upper edge. An independent means to drive the screw is further provided.

The independent means comprises an elongated wrench having an axially disposed socket at one end. The socket has an inner cylindrical wall with at least one recess disposed longitudinally. The wrench further comprises at least one detachable plug suitably sized and adapted to engage the recess disposed longitudinally along the inner cylindrical wall and a means for tethering each detachable plug to the wrench. Each of the detachable plugs is movable between a first position, in which the detachable plug is disposed within the socket where it may engage the recess disposed longitudinally along the inner cylindrical wall thereof, and a second position, in which the detachable plug is disposed outside of the socket.

BRIEF DESCRIPTION OF THE DRAWINGS

Preferred embodiments of the invention are described hereinafter with reference to the accompanying drawing wherein:

FIG. 4 is a perspective view of the first preferred embodiment of the apparatus for a theft resistant fastener of the present invention showing the head of the screw disposed in the borehole of the cover.

FIG. 5 is a cross-section view taken along line 5—5 of FIG. 1, showing the cylindrical shape of the outer wall of the socket, the generally cylindrical shape and longitudinal recesses of the inner wall of the socket, and the sleeve for the cable to be guided through.

FIG. 6 is a cross-section view taken along line 6—6 of FIG. 1, showing the generally cylindrical shape and longitudinal recesses of the outer wall of the head of the screw.

FIG. 7 is a cross-section view taken along line 7—7 of FIG. 3, showing the shank of a screw disposed through the cover plate and in threaded engagement with a base to which the cover plate is fastened, the plugs disposed in a cavity formed by the alignment of the recess in the inner cylindrical wall of the socket and the recess in the outer side wall of the head of the screw, the terminus of the recess in the outer side wall of the head of the screw at a spaced distance from its upper edge, the screw head disposed in the socket, and the socket body disposed in the borehole of the cover plate.

FIG. 8 is a cross-section view taken along line 8—8 of FIG. 7, showing in plan view the plugs disposed in the cavities formed by the alignment of the recesses in the inner cylindrical wall of the socket and the corresponding recesses in the outer side wall of the head of the screw, the relationship between the diameter of the screw head and the socket in which it is disposed, and the relationship between the diameter of the outer cylindrical wall of the socket body and the borehole of the cover plate in which it is disposed.

DETAILED DESCRIPTION OF THE INVENTION

Figures 4, 5, 6, 7, 8:
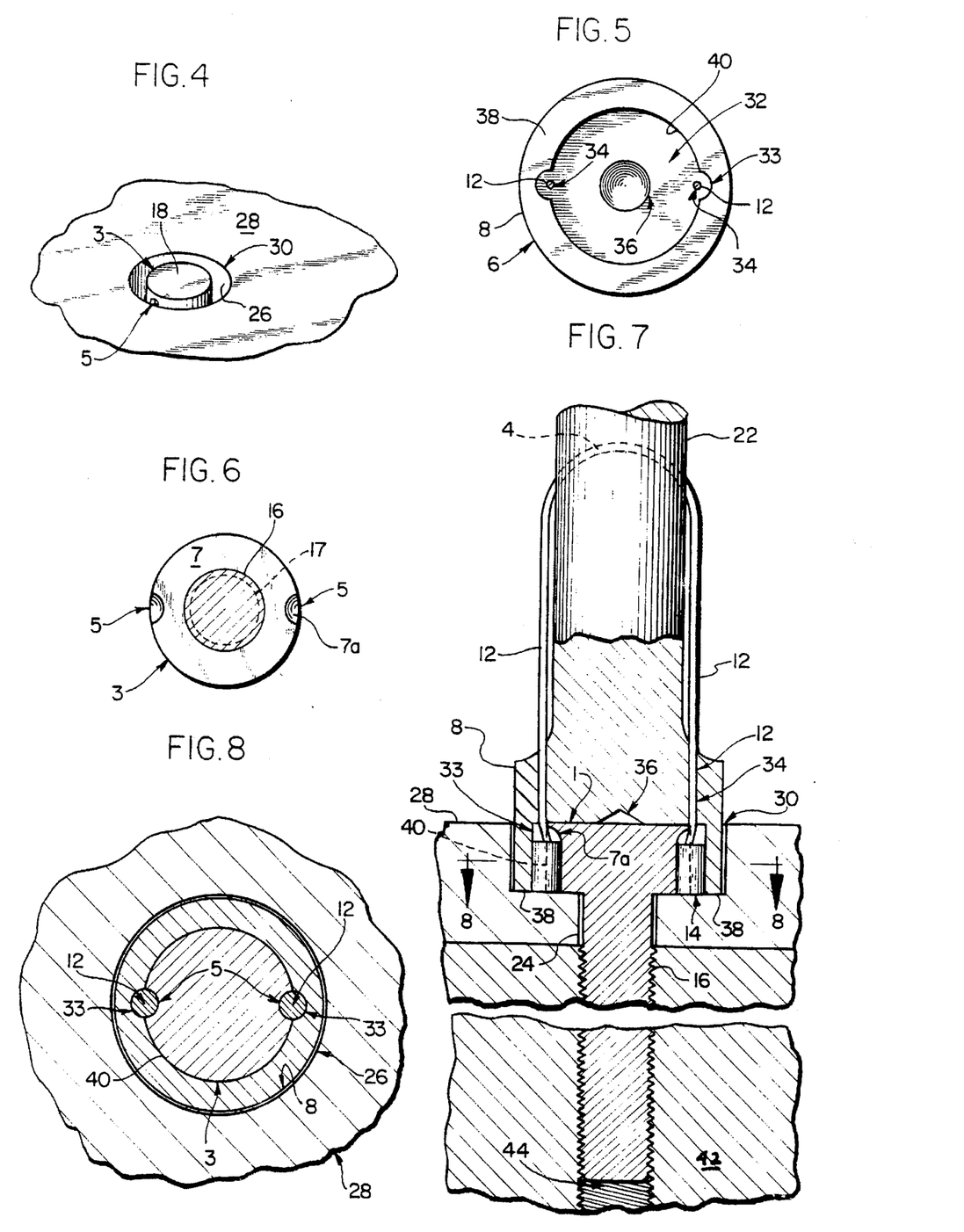

The preferred embodiments depicted in the drawing include an apparatus for a theft resistant fastener for fastening two members together comprising a screw 1 having a shank and a generally cylindrical head 3 disposed concentrically on an end of the shank. The generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and the outer side wall has at least one recess 5 extending longitudinally from its lower edge to a spaced distance from its upper edge. The top of the recess 7a is shown in FIG. 6. It is designed to be used with a removable tool which is described below.

As one example of two members that can be fastened together with the method and apparatus of this invention, the accompanying drawing shows a cover plate 28 (FIGS. 1–4, 7 and 8) fastened to a base 42 (FIG. 7). It will be understood, of course, that this invention will be useful in fastening together any appropriate types of articles or members.

Without departing from the generality of the invention disclosed herein, the screw 1 of the apparatus could easily have a head 3 of varying configurations that could not easily be removed without a complementary, mating tool. The discussion that follows, without limiting the scope of the invention, will refer to the invention as depicted in the drawing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
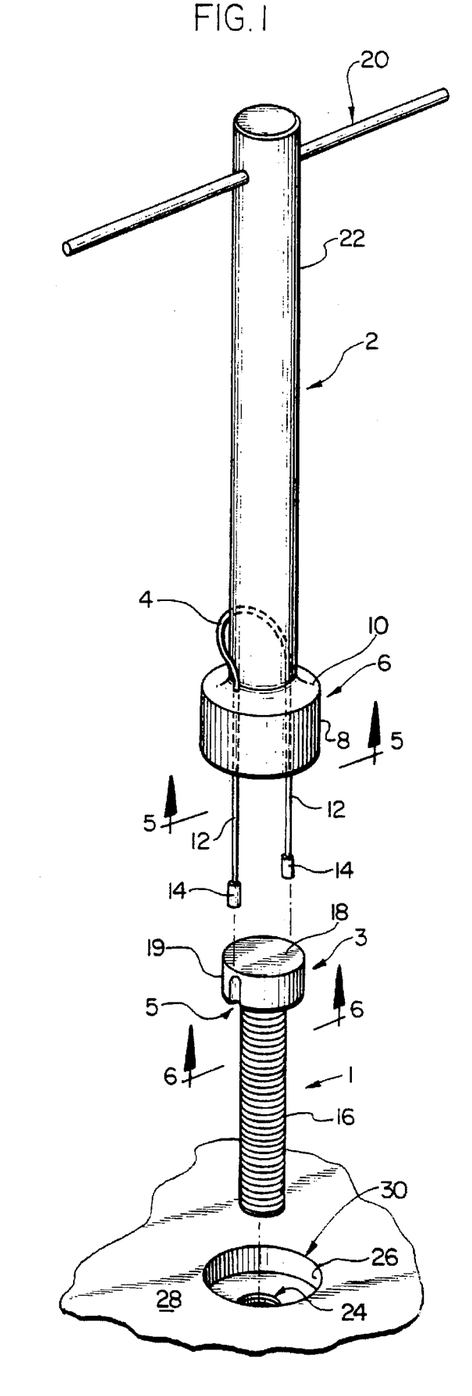
FIG. 1 is an exploded perspective view of a first preferred embodiment of the apparatus for a theft resistant fastener of the present invention showing a wrench having a socket disposed on one end with two moveable plugs extending outside of the socket which plugs can be engaged to the longitudinal recesses shown in the outer cylindrical wall of the head of a screw shown prior to fastening.

A preferred embodiment of the screw 1 of the invention is shown in FIG. 1. It shows an apparatus for a theft resistant fastener comprising a screw 1 having a shank and a generally cylindrical head 3 disposed concentrically on an end of said shank. The generally cylindrical head 3 has an outer side wall with an upper edge and a lower edge. The lower edge is proximate to the shank and the outer side wall has at least one recess 5 extending longitudinally from its lower edge to a spaced distance from its upper edge.

A preferred feature of the screw 1 of the invention teaches a top surface 18 of the head 3 which is free of any engageable indentations or engageable protrusions.

The apparatus for a theft resistant fastener further provides for an independent means to drive the screw 1. One such preferred embodiment of the means to drive the screw 1 is a wrench 2 having a screw head receiving socket 32 (best seen in FIGS. 5, 7 and 8). Modifications will be obvious to those skilled in the art. As shown in FIG. 1, the wrench has a handle 22 and a handle extension 20 to facilitate rotation. FIG. 7 shows an axial tooling recess 36 in the upper wall of the socket.

A preferred embodiment of the wrench 2 of this important invention comprises a wrench 2 having a socket 32, where the socket 32 is defined by an upper surface having a peripheral edge and an inner wall 40 having an upper edge connected to the peripheral edge of the upper surface. The inner wall 40 has at least one socket recess 33 disposed longitudinally. Additionally, the wrench 2 further comprises a movable plug 14 suitably sized and shaped to engage one of the socket recesses 33 disposed longitudinally along the inner wall 40. As depicted in FIG. 5, the inner wall 40 of the socket 32 is generally cylindrical.

Figure 2:
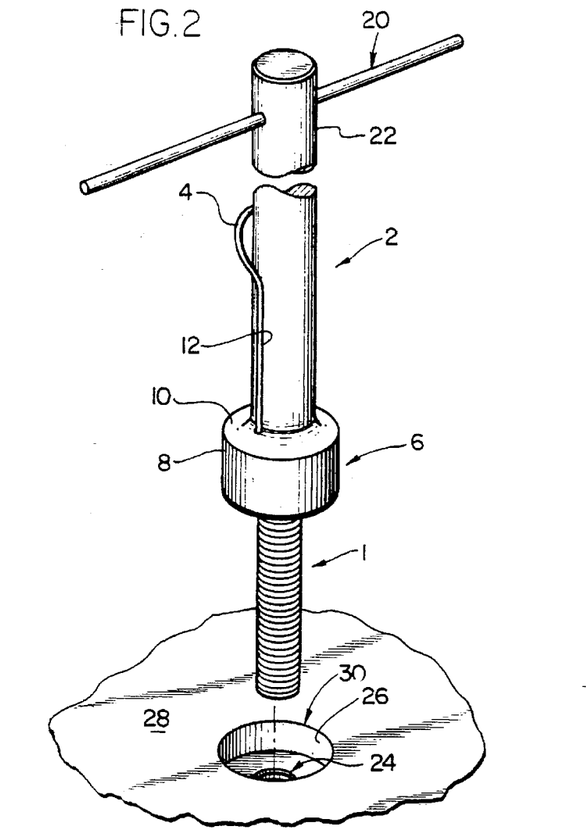
FIG. 2 is a perspective view of the first preferred embodiment of the apparatus for a theft resistant fastener of the present invention showing the threaded shank of the screw exposed from the socket of the wrench and with the moveable plug actuator having been drawn away from the socket forcing the plugs into engagement with the socket and screw head.

The socket 32 has a socket body 6 having an outer wall 8 with an upper edge and a top 10 with a peripheral edge; the upper edge of the outer wall 8 being connected to the peripheral edge of the top 10. As shown in FIGS. 1 and 2, the outer wall 8 of the socket body 6 is generally cylindrical in its preferred form. The bottom rim 38 of the socket body 6 is shown in FIG. 5.

Referring to FIG. 5, the socket 32 is defined by an upper surface having a peripheral edge and an inner wall 40 having an upper edge connected to the peripheral edge of the upper surface. The inner wall 40 has a plurality of socket recesses 33 disposed longitudinally. Referring to FIG. 1, the wrench 2 further comprises a corresponding number of movable plugs 14, each being suitably sized and shaped to engage one of the socket recesses 33 disposed longitudinally along the inner wall 40, as shown in FIG. 8.

The wrench 2 may further comprise a means for tethering each movable plug 14 to the wrench 2. The means for tethering each movable plug 14 to the wrench 2 may allow each movable plug 14 to move between a first position, in which the movable plug 14 is disposed within the socket 32 where it may engage the socket recess 33 disposed longitudinally along the inner wall 40 thereof, and a second position, in which the movable plug 14 is disposed outside of the socket 32.

Figure 3:
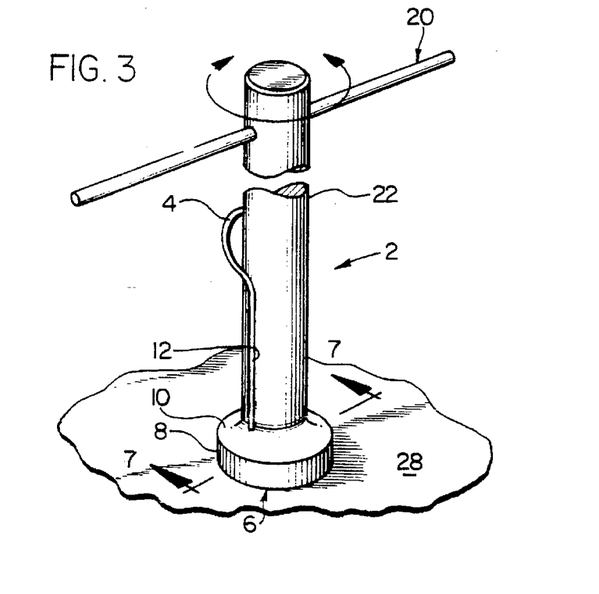
FIG. 3 is a perspective view of the first preferred embodiment of the apparatus for a theft resistant fastener of the present invention showing the socket of the wrench partially disposed within the borehole of the cover.

As shown in the drawing, a preferred embodiment of the means for tethering each movable plug 14 may comprise a flexible cable 12 and wherein the socket body 6 has a means for guiding the cable. As best shown in FIG. 7, the top of the socket body 6 has a means for guiding the cable. The cable 12 is routed through the guide means and has a proximate end attached to the movable plug 14 and a distal end that is disposed outside the socket body 6 proximate to the top thereof. As shown in FIG. 7, the guide means may comprise a sleeve 34 for each cable 12. The distal end of the cable 12 is manually actuable to move the plug 14 between its first and second positions. Such distal end may be configured, as shown in FIGS. 1, 2 and 3 to extend the cable 12 into a loop to serve as a cable actuator 4.

A preferred embodiment of the movable plug 14 of the invention reveals an elongated plug 14 whose thickness is less than the distance between the inner wall 40 and the outer wall 8 of the socket body 6. This facilitates the removal of the plug 14 from a countersunk borehole 30. In instances where the countersunk borehole 30 of a cover plate 28 or other article is sized only nominally larger than the socket body 6 and the head 3 of the screw 1 is only nominally smaller than the inner wall 40 of the socket 32, then the plugs 14 must necessarily be of limited thickness, otherwise it will not be possible to remove the plug 14 from the cavity defined by the wall 29 of the countersunk borehole 30 when the screw 1 is fully fastened in said borehole. In a preferred mode, the head diameter of the screw and socket body diameter would be engineered to minimize the wall thickness of the side wall of the socket, and thus limit the thickness of the plugs. This would inhibit theft of a screw imbedded in a surface with a countersunk borehole slightly larger than the outer diameter of the socket body, as the limited distance between the head and the outer wall of the countersunk hole would limit access to an extraneous tool.

Where the screw 1 has its recess 5 extending along the entire length of the outer wall 8 of the head, the thickness of the plug 14 may be larger in lateral dimension. Another preferred embodiment of the screw 1 provides that the head 3 has an outer side wall with at least one recess 5 extending longitudinally along the length thereof.

As shown in FIGS. 1 and 7, the plugs 14 and socket 32 of the wrench 2 attach to the screw 1 disclosed. As pointed out above, an exemplary use of the method and apparatus of this invention—to fasten a cover plate 28 to a base 42—is also disclosed in FIG. 7.

An embodiment of the method for producing a theft resistant fastening of a first member to a second member comprises the following steps: a. moving a moveable plug 14 of a wrench 2 having a socket body 6 with a socket 32 that has an inner wall 40 that has a socket recess 33 disposed longitudinally, to a position in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank 16, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses 5 extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; and d. bringing together the cylindrical head 3 of the screw 1 with the plug 14 engaged thereto and the socket, permitting the engaged plug 14 to be disposed in the socket recess 33 disposed longitudinally along the inner wall 40 of the socket.

In another embodiment of the method for a theft resistant fastener of the present invention the following steps are provided: a. moving a moveable plug 14 of a wrench 2 having a socket body 6 with a socket that has an inner wall 40 that has a socket recess 33 disposed longitudinally, to a position, in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank 16, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1.

Another preferred embodiment of the method for a theft resistant fastener of the present invention comprises the following steps: a. moving a moveable plug 14 of a wrench 2 having a socket body 6 with a socket that has an inner wall 40 that has a socket recess 33 disposed longitudinally, to a position, in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1; and h. freeing the moveable plug 14 from the recess 5 of the head 3 of the screw 1 and withdrawing the moveable plug 14 of the wrench 2 from the countersunk borehole 30 of the cover plate 28, thereby disengaging the wrench 2 from the screw 1.

In another preferred embodiment of the method of this invention the following steps are provided: a. moving each of a plurality of moveable plugs 14 of a wrench 2 having a socket body 6 with a socket that has an inner wall 40 that has a corresponding number of socket recesses 33 disposed longitudinally, to a position, in which the movable plugs 14 are disposed outside of the socket; b. engaging each of the movable plugs 14 disposed outside of the socket to a recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recesses 33 on the inner wall 40 of the socket in alignment with the engaged plugs 14 disposed along the recesses of the outer wall 8 of the head 3 of the screw 1; and d. bringing together the cylindrical head 3 of the screw 1 with the plugs 14 engaged thereto and the socket, permitting the engaged plugs 14 to be disposed in the socket recesses 33 disposed longitudinally along the inner wall 40 of the socket.

Another embodiment of the method of the present invention comprises the following steps: a. moving a moveable plug 14 of a wrench 2 having a socket body 6 with a socket that has an inner wall 40 that has a socket recess 33 disposed longitudinally, to a position in which the movable plugs 14 are disposed outside of the socket; b. engaging the movable plug 14 disposed outside of the socket to the recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recess 33 on the inner wall 40 of the socket in alignment with the engaged plug 14 disposed along the recess 5 of the outer wall 8 of the head 3 of the screw 1; d. bringing together the cylindrical head 3 of the screw 1 with the plug 14 engaged thereto and the socket, permitting the engaged plug 14 to be disposed in the socket recess 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recess 5 extending along the outer wall 8 of the generally cylindrical head 3 of the screw 1; f. driving the screw 1 into threaded engagement with a threaded bore 44 of a base 42, thereby securing the screw 1 and cover plate 28 to the base 42; g. axially withdrawing the socket of the wrench 2 from the countersunk borehole 30 of the cover plate 28, allowing the engaged plug 14 to remain engaged to the recess 5 of the head 3 of the screw 1; and h. freeing the moveable plug 14 from the recess 5 of the head 3 of the screw 1 and withdrawing the moveable plug 14 of the wrench 2 from the countersunk borehole 30 of the cover plate 28, thereby disengaging the wrench 2 from the screw 1.

Another preferred method of the present invention, which can be easily visualized by reference to the drawing, comprises the following steps: a. moving each of a plurality of moveable plugs 14 of a wrench 2 having a socket body 6 with a socket that has an inner wall 40 that has a corresponding number of socket recesses 33 disposed longitudinally, to a position in which the movable plugs 14 are disposed outside of the socket; b. engaging each of the movable plugs 14 disposed outside of the socket to a recess 5 extending longitudinally along an outer wall 8 of a generally cylindrical head 3 of a screw 1 that has a threaded shank, the generally cylindrical head 3 has a top surface 18 with a peripheral edge, a bottom surface 7 with a peripheral edge, the bottom surface 7 is disposed proximate to the shank, and an outer side wall with an upper edge and a lower edge, the top surface 18 having its peripheral edge connected to the upper edge of the outer side wall and the bottom surface 7 having its peripheral edge connected to the lower edge of the outer side wall, and each of the recesses extends longitudinally from its lower edge to a spaced distance from its upper edge; c. positioning the socket recesses 33 on the inner wall 40 of the socket in alignment with the engaged plugs 14 disposed along the recesses of the outer wall 8 of the head 3 of the screw 1; d. bringing together the cylindrical head 3 of the screw 1 with the plugs 14 engaged thereto and the socket, permitting the engaged plugs 14 to be disposed in the socket recesses 33 disposed longitudinally along the inner wall 40 of the socket; e. positioning the threaded end of the shank of the screw 1 through a bore having a countersunk borehole 30 of sufficient diameter to accommodate the socket body 6 and of axial length greater than the length of the recesses extending along the outer wall 8 of the generally cylindrical head 3 of the screw 1; f. driving the screw 1 into threaded engagement with a threaded bore 44 of a base 42, thereby securing the screw 1 and cover plate 28 to the base 42; g. axially withdrawing the socket of the wrench 2 from the countersunk borehole 30 of the cover plate 28, allowing the engaged plugs 14 to remain engaged to the recesses 5 of the head 3 of the screw 1; and h. freeing the moveable plugs 14 from the recesses 5 of the head 3 of the screw 1 and withdrawing the moveable plugs 14 of the wrench 2 from the countersunk borehole 30 of the cover plate 28, thereby disengaging the wrench 2 from the screw 1.

Another preferred embodiment of the method for a of the present invention comprises the following steps: a. moving each of a plurality of moveable plugs 14 of a wrench 2 having a socket with an inner cylindrical wall that has a corresponding number of socket recesses 33 disposed longitudinally, to a position in which the movable plugs 14 are disposed outside of the socket; b. engaging each of the movable plugs disposed outside of the socket to a recess 5 extending longitudinally along an outer cylindrical wall of a generally cylindrical head 3 of a screw 1 that has a threaded shank; c. moving the engaged plugs and the cylindrical head 3 of the screw 1 into the socket in a manner that permits the movable plugs to engage the socket recesses 33 disposed longitudinally along the inner cylindrical wall of the socket; d. positioning the threaded end of the shank of the screw 1 through a bore having a counter sunk borehole disposed in an exposed surface of a cover plate 28 and into pre-engagement contact with a threaded hole in a base 42; e. driving the screw 1 into threaded engagement with the base 42, thereby securing the screw 1 and cover plate 28 to the base 42; and f. axially withdrawing the plugs and socket of the wrench 2 from the counter sunk borehole of the cover plate 28, thereby disengaging the wrench 2 from the screw 1.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

My invention resides not in any one of these features per se, but rather in the particular combination of all of them herein disclosed and claimed and it is distinguished from the prior art in this particular combination of all of its structures for the function specified.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed as being new and desired to be protected by Letters Patent of the United States is as follows:

1. An apparatus for a theft resistant fastener comprising a screw having a shank and a generally cylindrical head disposed concentrically on an end of said shank, said generally cylindrical head has a top surface with a circular peripheral edge, a bottom surface with a peripheral edge, said bottom surface is disposed proximate to the shank, and a generally smooth outer side wall with an upper edge and a lower edge, the top surface having its peripheral edge connected to the upper edge of the outer side wall and the bottom surface having its peripheral edge connected to the lower edge of the outer side wall, and said outer side wall has at least one recess extending longitudinally from its lower edge to a spaced distance from its upper edge.

2. The apparatus for a theft resistant fastener of claim 1 wherein the top surface of the head is free of any engageable variations.

3. The apparatus for a theft resistant fastener of claim 1 further comprising an independent means to drive said screw.

4. An apparatus for a theft resistant fastener comprising a wrench having a socket for fastening a screw, said socket being defined by an upper surface having a peripheral edge and a generally smooth inner wall having an upper edge connected to the peripheral edge of the upper surface, said inner wall has at least one recess disposed longitudinally; and said wrench further comprises a movable plug suitably sized and shaped to engage one of the recesses disposed longitudinally along the inner wall, said movable plug being movable in a direction substantially parallel to the rotatable axis of the socket, whereby, the movable plug engaged in said one recess comprises a means to drive a screw having a complementary recess.

5. The apparatus for a theft resistant fastener of claim 4, wherein the inner wall of the socket is generally cylindrical.

6. The apparatus for a theft resistant fastener of claim 4, in which the socket has a socket body having an outer wall with an upper edge and a top with a peripheral edge, the upper edge of the outer wall being connected to the peripheral edge of the top.

7. The apparatus for a theft resistant fastener of claim 6, wherein the outer wall of the socket body is generally cylindrical.

8. An apparatus for a theft resistant fastener comprising a wrench having a socket for fastening a screw, said socket being defined by an upper surface having a peripheral edge and a generally smooth inner wall having an upper edge connected to the peripheral edge of the upper surface, said inner wall has a plurality of recesses disposed longitudinally; and said wrench further comprises a corresponding number of movable plugs, each being suitably sized and shaped to engage one of the recesses disposed longitudinally along the inner wall, said movable plug being movable in a direction substantially parallel to the rotatable axis of the socket, whereby, each movable plug engaged in a respective recess comprises a means to drive a screw having a complementary recess.

9. The apparatus for a theft resistant fastener of claim 4, further comprising a screw having a shank and a generally cylindrical head disposed concentrically on an end of said shank, said generally cylindrical head has an outer side wall with at least one recess extending longitudinally along the length thereof.

10. The apparatus for a theft resistant fastener of claim 8, in which the movable plug is elongated and its thickness is less than the distance between the inner wall and the outer wall of the socket body.

11. An apparatus for a theft resistant fastener comprising a wrench having a socket for fastening a screw, said socket being defined by an upper surface having a peripheral edge and a generally smooth inner wall having an upper edge connected to the peripheral edge of the upper surface, said inner wall has at least one recess disposed longitudinally;

said wrench further comprises at least one movable plug equal in number to the number of said at least one recess, each plug being suitably sized and shaped to engage one of said at least one recess disposed longitudinally along the inner wall, said at least one movable plug directable in a being movable substantially parallel to the rotatable axis of the socket; and a means for tethering each movable plug to the wrench, in which the movable plug is movable axially between a first position, in which the movable plug is disposed within the socket where it may engage one of said at least one recess disposed longitudinally along the inner wall thereof, and a second position, in which the movable plug is disposed outside of the socket, whereby, said at least one movable plug engaged in a respective recess comprises a means to drive a screw having a complementary recess.

12. A method for producing a theft resistant fastening of a first member to a second member, which comprises the following steps:

a. moving a moveable plug of a wrench having a socket body with a socket that has an inner wall that has a recess disposed longitudinally, in a direction substantially parallel to the rotatable axis of the socket, to a position in which the movable plug is disposed axially outside of the socket;

b. engaging the movable plug disposed outside of the socket to a recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and said recess of said screw extends longitudinally from its lower edge to a spaced distance from its upper edge;

c. positioning the recess on the inner wall of the socket in alignment with the engaged plug disposed along the recess of the outer wall of the head of the screw; and d. bringing together the cylindrical head of the screw with the plug engaged thereto and the socket, permitting the engaged plug to be disposed in the recess disposed longitudinally along the inner wall of the socket.

13. A method for producing a theft resistant fastening of a first member to a second member, which comprises the following steps:

a. moving a moveable plug of a wrench having a socket body with a socket that has an inner wall that has a recess disposed longitudinally, to a position, in which the movable plugs are disposed outside of the socket;

b. engaging the movable plug disposed outside of the socket to the recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and each of said recesses extends longitudinally from its lower edge to a spaced distance from its upper edge;

c. positioning the recess on the inner wall of the socket in alignment with the engaged plug disposed along the recess of the outer wall of the head of the screw;

d. bringing together the cylindrical head of the screw with the plug engaged thereto and the socket, permitting the engaged plug to be disposed in the recess disposed longitudinally along the inner wall of the socket; and e. positioning the threaded end of the shank of the screw through a bore having a countersunk borehole of sufficient diameter to accommodate the socket body and of axial length greater than the length of the recess extending along the outer wall of the generally cylindrical head of the screw.

14. A method for producing a theft resistant fastening of a first member to a second member, which comprises the following steps:

a. moving a moveable plug of a wrench having a socket body with a socket that has an inner wall that has a recess disposed longitudinally, to a position, in which the movable plugs are disposed outside of the socket;

b. engaging the movable plug disposed outside of the socket to the recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and each of said recesses extends longitudinally from its lower edge to a spaced distance from its upper edge;

c. positioning the recess on the inner wall of the socket in alignment with the engaged plug disposed along the recess of the outer wall of the head of the screw;

d. bringing together the cylindrical head of the screw with the plug engaged thereto and the socket, permitting the engaged plug to be disposed in the recess disposed longitudinally along the inner wall of the socket;

e. positioning the threaded end of the shank of the screw through a bore having a countersunk borehole of sufficient diameter to accommodate the socket body and of axial length greater than the length of the recess extending along the outer wall of the generally cylindrical head of the screw; and f. freeing the moveable plug from the recess of the head of the screw and withdrawing the moveable plug of the wrench from the countersunk borehole of the cover plate, thereby disengaging the wrench from the screw.

15. A method for producing a theft resistant fastening of a first member to a second member, which comprises the following steps:
   a. moving each of a plurality of moveable plugs of a wrench having a socket body with a socket that has an inner wall that has a corresponding number of recesses disposed longitudinally, in a direction substantially parallel to the rotatable axis of the socket, to a position in which the movable plugs are disposed axially outside of the socket;
   b. engaging each of the movable plugs disposed outside of the socket to a recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and each of said recesses extends longitudinally from its lower edge to a spaced distance from its upper edge;
   c. positioning the recesses on the inner wall of the socket in alignment with the engaged plugs disposed along the recesses of the outer wall of the head of the screw; and
   d. bringing together the cylindrical head of the screw with the plugs engaged thereto and the socket, permitting the engaged plugs to be disposed in the recesses disposed longitudinally along the inner wall of the socket.

16. A method for producing a theft resistant fastening of a first member to a second member, which comprises the following steps:
   a. moving a moveable plug of a wrench having a socket body with a socket that has an inner wall that has a recess disposed longitudinally, to a position in which the movable plugs are disposed outside of the socket;
   b. engaging the movable plug disposed outside of the socket to the recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and each of said recesses extends longitudinally from its lower edge to a spaced distance from its upper edge;
   c. positioning the recess on the inner wall of the socket in alignment with the engaged plug disposed along the recess of the outer wall of the head of the screw;
   d. bringing together the cylindrical head of the screw with the plug engaged thereto and the socket, permitting the engaged plug to be disposed in the recess disposed longitudinally along the inner wall of the socket;
   e. inserting the threaded end of the shank of the screw through a bore in said first member to extend the threaded end of the shank beyond the first member to a position adjacent said second member, said bore having a countersunk borehole of sufficient diameter to accommodate the socket body and of axial length greater than the length of the recess extending along the outer wall of the generally cylindrical head of the screw;
   f. driving the screw into threaded engagement with a threaded bore of said second member, thereby securing the screw and the first member to the second member;
   g. axially withdrawing the socket of the wrench from the countersunk borehole of said first member, allowing the engaged plug to remain engaged to the recess of the head of the screw; and
   h. freeing the moveable plug from the recess of the head of the screw and withdrawing the moveable plug of the wrench from the countersunk borehole of the first member, thereby disengaging the wrench from the screw.

17. A method for producing a theft resistant fastening of a first member to a second member, which comprises the following steps:
   a. moving each of a plurality of moveable plugs of a wrench having a socket body with a socket that has an inner wall that has a corresponding number of recesses disposed longitudinally, to a position in which the movable plugs are disposed outside of the socket;
   b. engaging each of the movable plugs disposed outside of the socket to a recess extending longitudinally along an outer wall of a generally cylindrical head of a screw that has a threaded shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and each of said recesses extends longitudinally from its lower edge to a spaced distance from its upper edge;
   c. positioning the recesses on the inner wall of the socket in alignment with the engaged plugs disposed along the recesses of the outer wall of the head of the screw;
   d. bringing together the cylindrical head of the screw with the plugs engaged thereto and the socket, permitting the engaged plugs to be disposed in the recesses disposed longitudinally along the inner wall of the socket;
   e. inserting the threaded end of the shank of the screw through a bore in said first member to extend the threaded end of the shank beyond the first member to a position adjacent said second member, said bore having a countersunk borehole of sufficient diameter to accommodate the socket body and of axial length greater than the length of the recesses extending along the outer wall of the generally cylindrical head of the screw;
   f. driving the screw into threaded engagement with a threaded bore of said second member, thereby securing the screw and the first member to the second member;
   g. axially withdrawing the socket of the wrench from the countersunk borehole of said first member, allowing the engaged plugs to remain engaged to the recesses of the head of the screw; and
   h. freeing the moveable plugs from the recesses of the head of the screw and withdrawing the moveable plugs of the wrench from the countersunk borehole of the first member, thereby disengaging the wrench from the screw.

18. A method for producing a theft resistant fastening a first member to a second member, which comprises the following steps:
  a. moving each of a plurality of moveable plugs of a wrench having a socket with an inner cylindrical wall that has a corresponding number of recesses disposed longitudinally, in a direction substantially parallel to the rotatable axis of the socket, to a position, in which the movable plugs are disposed axially outside of the socket;
  b. engaging each of the movable plugs disposed outside of the socket to a recess extending longitudinally along an outer cylindrical wall of a generally cylindrical head of a screw that has a threaded shank;
  c. moving the engaged plugs and the cylindrical head of the screw into the socket in a manner that permits the movable plugs to engage the recesses disposed longitudinally along the inner cylindrical wall of the socket;
  d. inserting the threaded end of the shank of the screw through a bore in said first member to extend the threaded end of the shank beyond the first member to a position adjacent said second member, said bore having a counter sunk borehole disposed in an exposed surface of said first member and into pre-engagement contact with a threaded hole in said second member;
  e. driving said screw into threaded engagement with the second member, thereby securing the screw and first member to the second member; and
  f. axially withdrawing the plugs and socket of the wrench from the counter sunk borehole of the first member, thereby disengaging the wrench from the screw.

19. An apparatus for a theft resistant fastener comprising a wrench having a socket,
  said socket being defined by an upper surface having a peripheral edge and an inner wall having an upper edge connected to the peripheral edge of the upper surface,
  said inner wall has at least one recess disposed longitudinally;
  said wrench further comprises at least one movable plug equal in number to the number of said at least one recess, each plug being suitably sized and shaped to engage one of said at least one recess disposed longitudinally along the inner wall; and
  a means for tethering each movable plug to the wrench, in which the movable plug is movable between a first position, in which the movable plug is disposed within the socket where it may engage one of said at least one recess disposed longitudinally along the inner wall thereof, and a second position, in which the movable plug is disposed outside of the socket,
  said means for tethering each movable plug comprises a flexible cable and wherein the socket body has a means for guiding said cable.

20. An apparatus for a theft resistant fastener comprising a wrench having a socket,
  said socket being defined by an upper surface having a peripheral edge and an inner wall having an upper edge connected to the peripheral edge of the upper surface,
  said inner wall has at least one recess disposed longitudinally;
  said wrench further comprises at least one movable plug equal in number to the number of said at least one recess, each plug being suitably sized and shaped to engage one of said at least one recess disposed longitudinally along the inner wall; and
  a means for tethering each movable plug to the wrench, in which the movable plug is movable between a first position, in which the movable plug is disposed within the socket where it may engage one of said at least one recess disposed longitudinally along the inner wall thereof, and a second position, in which the movable plug is disposed outside of the socket,
  said means for tethering each movable plug comprises a flexible cable and wherein the top of the socket body has a means for guiding said cable,
  said cable being routed through said guide means and having a proximate end of said cable being attached to the movable plug and a distal end being disposed outside the socket body proximate to the top thereof, and the distal end of the cable is manually actuable to move the plug between its first and second positions.

21. An apparatus for a theft resistant fastener comprising a wrench having a socket,
  said socket being defined by an upper surface having a peripheral edge and an inner wall having an upper edge connected to the peripheral edge of the upper surface,
  said inner wall has at least one recess disposed longitudinally;
  said wrench further comprises at least one movable plug equal in number to the number of said at least one recess, each plug being suitably sized and shaped to engage one of said at least one recess disposed longitudinally along the inner wall;
  a means for tethering each movable plug to the wrench, in which the movable plug is movable between a first position, in which the movable plug is disposed within the socket where it may engage one of said at least one recess disposed longitudinally along the inner wall thereof, and a second position, in which the movable plug is disposed outside of the socket,
  said means for tethering each movable plug comprises a flexible cable and wherein the socket body has a means for guiding said cable; and
  further comprising a screw having a shank and a generally cylindrical head disposed concentrically on an end of said shank,
  said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and
  said outer side wall has at least one recess extending longitudinally from its lower edge to a spaced distance from its upper edge.

22. An apparatus for a theft resistant fastener comprising a wrench having a socket,
  said socket being defined by an upper surface having a peripheral edge and an inner wall having an upper edge connected to the peripheral edge of the upper surface,
  said inner wall has at least one recess disposed longitudinally;
  said wrench further comprises at least one movable plug equal in number to the number of said at least one recess, each plug being suitably sized and shaped to engage one of said at least one recess disposed longitudinally along the inner wall;
  a means for tethering each movable plug to the wrench, in which the movable plug is movable between a first position, in which the movable plug is disposed within the socket where it may engage one of said at least one recess disposed longitudinally along the inner wall thereof, and a second position, in which the movable plug is disposed outside of the socket, said means for tethering each movable plug comprises a flexible cable and wherein the top of the socket body has a means for guiding said cable, said cable being routed through said guide means and having a proximate end of said cable being attached to the movable plug and a distal end being disposed outside the socket body proximate to the top thereof, and the distal end of the cable is manually actuable to move the plug between its first and second positions; and further comprising a screw having a shank and a generally cylindrical head disposed concentrically on an end of said shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and said outer side wall has at least one recess extending longitudinally from its lower edge to a spaced distance from its upper edge.

23. The apparatus for a theft resistant fastener as in any of claims 4–11 or 10, further comprising a screw having a shank and a generally cylindrical head disposed concentrically on an end of said shank, said generally cylindrical head has a top surface with a peripheral edge, a bottom surface with a peripheral edge, said bottom surface is disposed proximate to the shank, and an outer side wall with an upper edge and a lower edge, the top surface having its peripheral edge connected to the upper edge of the outer side wall and the bottom surface having its peripheral edge connected to the lower edge of the outer side wall, and said outer side wall has at least one recess extending longitudinally from its lower edge to a spaced distance from its upper edge.

* * * * *